(12) United States Patent
Yoshida et al.

(10) Patent No.: US 11,813,823 B2
(45) Date of Patent: Nov. 14, 2023

(54) MULTILAYER STRUCTURE, AND PACKAGING MATERIAL FOR RETORT USING SAME

(71) Applicant: KURARAY CO., LTD., Okayama (JP)

(72) Inventors: Kentaro Yoshida, Kurashiki (JP); Makoto Suzuki, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 265 days.

(21) Appl. No.: 17/438,406

(22) PCT Filed: Mar. 9, 2020

(86) PCT No.: PCT/JP2020/010086
§ 371 (c)(1),
(2) Date: Sep. 10, 2021

(87) PCT Pub. No.: WO2020/184523
PCT Pub. Date: Sep. 17, 2020

(65) Prior Publication Data
US 2022/0143959 A1    May 12, 2022

(30) Foreign Application Priority Data

Mar. 11, 2019  (JP) ................................. 2019-043280

(51) Int. Cl.
| | | |
|---|---|---|
| *B32B 27/08* | (2006.01) | |
| *B29C 48/00* | (2019.01) | |
| *B29C 48/08* | (2019.01) | |
| *B29C 48/21* | (2019.01) | |
| *B29B 17/04* | (2006.01) | |
| *B29C 55/00* | (2006.01) | |
| *B29C 55/12* | (2006.01) | |
| *B32B 27/30* | (2006.01) | |
| *B32B 27/32* | (2006.01) | |
| *B65D 65/40* | (2006.01) | |
| *C08J 5/18* | (2006.01) | |
| *C08J 11/04* | (2006.01) | |
| *B29K 23/00* | (2006.01) | |
| *B29K 105/00* | (2006.01) | |
| *B29L 7/00* | (2006.01) | |
| *B29L 9/00* | (2006.01) | |

(52) U.S. Cl.
CPC .............. *B32B 27/08* (2013.01); *B29B 17/04* (2013.01); *B29C 48/0018* (2019.02); *B29C 48/022* (2019.02); *B29C 48/08* (2019.02); *B29C 48/21* (2019.02); *B29C 55/005* (2013.01); *B29C 55/12* (2013.01); *B32B 27/306* (2013.01); *B32B 27/32* (2013.01); *B65D 65/40* (2013.01); *C08J 5/18* (2013.01); *C08J 11/04* (2013.01); *B29K 2023/086* (2013.01); *B29K 2023/12* (2013.01); *B29K 2105/0097* (2013.01); *B29L 2007/008* (2013.01); *B29L 2009/00* (2013.01); *B32B 2255/10* (2013.01); *B32B 2255/205* (2013.01); *B32B 2307/42* (2013.01); *B32B 2307/518* (2013.01); *B32B 2307/7244* (2013.01); *B32B 2307/732* (2013.01); *B32B 2553/00* (2013.01); *C08J 2323/10* (2013.01); *C08J 2329/04* (2013.01); *C08J 2377/00* (2013.01)

(58) Field of Classification Search
CPC ........ B29C 17/04; B32B 27/306; B32B 27/32
See application file for complete search history.

(56) References Cited

U.S. PATENT DOCUMENTS

| | | |
|---|---|---|
| 5,770,301 A | 6/1998 | Murai et al. |
| 2011/0045314 A1 | 2/2011 | Igarashi et al. |
| 2016/0312942 A1 | 10/2016 | Ogawara et al. |
| 2018/0251278 A1 | 9/2018 | Sasaki et al. |

FOREIGN PATENT DOCUMENTS

| | | |
|---|---|---|
| EP | 3845380 A1 | 7/2021 |
| JP | 2002-308285 A | 10/2002 |
| JP | 2002-331578 A | 11/2002 |
| JP | 2007-283568 A | 11/2007 |
| JP | 2009-079762 A | 4/2009 |
| JP | 2014-126098 A | 7/2014 |
| JP | 2014-129894 A | 7/2014 |
| JP | 2015-183059 A | 10/2015 |
| JP | 2019-135094 A | 8/2019 |
| WO | 2015/087976 A1 | 6/2015 |
| WO | 2017/047103 A1 | 3/2017 |
| WO | 2020/045629 A1 | 3/2020 |

OTHER PUBLICATIONS

Machine Translation for JP 2009-079762 (Year: 2009).*
International Search Report issued in corresponding International Patent Application No. PCT/JP2020/010086 dated Jun. 2, 2020.

* cited by examiner

*Primary Examiner* — Zachary M Davis
(74) *Attorney, Agent, or Firm* — Morgan, Lewis & Bockius LLP

(57) ABSTRACT

The present invention relates to a multilayer structure at least an outer layer and an inner layer which contain a polypropylene resin as a main component, a barrier resin layer containing an ethylene-vinyl alcohol copolymer as a main component, and a metal deposited layer containing aluminum as a main component; a packaging material for a retort therewith; a method for recovering the multilayer structure; and a recovered composition comprising a recovered material of the multilayer structure. There is provided a multilayer structure exhibiting excellent recyclability and excellent appearance, gas barrier ability and shading performance both before and after retorting treatment, and a packaging material for a retort therewith.

18 Claims, No Drawings

MULTILAYER STRUCTURE, AND PACKAGING MATERIAL FOR RETORT USING SAME

TECHNICAL FIELD

The present invention relates to a multilayer structure at least an outer layer and an inner layer which contain a polypropylene resin as a main component, a barrier resin layer containing an ethylene-vinyl alcohol copolymer as a main component, and a metal deposited layer containing aluminum as a main component; a packaging material for a retort therewith; a method for recovering the multilayer structure; and a recovered composition comprising a recovered material of the multilayer structure.

BACKGROUND ART

Packaging materials for long-term storage of foods are often required to have gas barrier ability such as oxygen barrier ability. Oxidation of foods by oxygen and propagation of microorganisms can be suppressed by using a packaging material having higher gas barrier ability. As foods with a further extended edible period, retort foods have increased, which are prepared by filling a packaging material with foods and then sterilizing it by hot water under pressure. As a gas barrier layer for packaging materials for a retort, an aluminum foil or a gas barrier film in which a vapor-deposited layer of silicon oxide or aluminum oxide is laminated on a highly heat-resistant polyester film is commonly used. When an aluminum foil is used, not only shading performance but also gas barrier ability can be imparted, and when a gas barrier film in which a vapor-deposited layer of silicon oxide or aluminum oxide is laminated is used, visibility of a content can be imparted (Patent References No. 1 and 2).

An ethylene-vinyl alcohol copolymer (hereinafter, sometimes abbreviated as EVOH) which is widely used as a gas barrier resin in a packaging material, is crystallized and densified by hydrogen bonding between hydroxy groups in the molecule, exhibiting gas barrier ability.

In recent years, demand for so-called post-consumer recycling (hereinafter, sometimes simply abbreviated as recycling) in which packaging materials consumed in the market are recovered and recycled, has been globally increased due to environmental problems and waste problems. Recycling is generally conducted by a process comprising cutting a recovered packaging material and, after, if necessary, sorting and washing, melt-mixing it using an extruder.

PRIOR ART REFERENCES

Patent References

Patent Reference No. 1: JP 2002-331578A
Patent Reference No. 2: JP 2002-308285A

SUMMARY OF THE INVENTION

Problems to be Solved by the Invention

However, EVOH exhibits high gas barrier ability in a dry state, but in a wet state due to influence of moisture or the like, hydrogen bonds tend to loosen, leading to lower gas barrier ability. It is, therefore, generally difficult to use a layer made of EVOH as a gas barrier layer for a packaging material for a retort.

In addition, an aluminum deposited layer, which is widely used as a packaging material as a gas barrier layer for dried foods, is less stable against hot water, and it is generally difficult to use it as a gas barrier layer for a packaging material for a retort.

Furthermore, an aluminum foil and a polyester film, which are widely used in a conventional packaging material for a retort, cannot be uniformly mixed with other components in a melt-mixing step of a recovery and recycling process, which makes recycling difficult.

In view of such a situation, an objective of the present invention is to provide a multilayer structure exhibiting excellent recyclability and excellent appearance, gas barrier ability and shading performance both before and after retorting treatment, and a packaging material for a retort therewith.

Means for Solving the Problems

In the process of investigating a multi-layer structure exhibiting excellent recyclability, we have found that when an EVOH layer and an aluminum-deposited layer, which have been difficult to apply for a packaging material for a retort, are combined, and a multilayer structure has a particular structure, it is excellent in appearance, gas barrier ability and shading performance both before and after retorting treatment, and is also excellent in recyclability. Based on these findings, we have further studied, achieving the present invention. Specifically, the above problems can be solved by providing the followings.

[1] A four or more layered multilayer structure comprising at least an outer layer (A) containing a polypropylene resin (a) as a main component, an inner layer (B) containing a polypropylene resin (b) as a main component, a barrier resin layer (C) containing an ethylene-vinyl alcohol copolymer (c) as a main component, and a metal deposited layer (D) containing aluminum as a main component, wherein the barrier resin layer (C) and the metal deposited layer (D) are positioned between the outer layer (A) and the inner layer (B); the total thickness is 200 μm or less; the polypropylene resin (a) and the polypropylene resin (b) have a melting point of 140° C. or more and less than 170° C., respectively; the ethylene-vinyl alcohol copolymer (c) has an ethylene unit content of 15 to 60 mol % and a saponification degree of 85 mol % or more; and the multilayer structure contains neither a layer containing a resin having a melting point of less than 140° C. as a main component, a layer containing a resin having a melting point of 240° C. or more, nor a metal layer having a thickness of 1 μm or more.

[2] The multilayer structure as described in [1], wherein the barrier resin layer (C) and the metal deposited layer (D) are adjacent to each other.

[3] The multilayer structure as described in [1] or [2], wherein the barrier resin layer (C) is a monolayer film having a thickness of 8 to 40 μm.

[4] The multilayer structure as described in [3], wherein the monolayer film is biaxially stretched.

[5] The multilayer structure as described in [1] or [2], wherein the barrier resin layer (C) is one layer of a coextruded film consisting of two or more layers including the barrier resin layer (C); a thickness of the coextruded film is 8 to 120 μm; and a thickness of the barrier resin layer (C) is 1 to 20 μm.

[6] The multilayer structure as described in [5], wherein the coextruded film is biaxially stretched.

[7] The multilayer structure as described in [5] or [6], wherein a layer of the coextruded film except for the barrier resin layer (C) is composed of a layer containing a polypropylene resin as a main component.

[8] The multilayer structure as described in [1] to [7], wherein at least one barrier resin layer (C) is positioned in the outer layer (A) side with respect to at least one metal deposited layer (D).

[9] The multilayer structure as described in [1] to [8], wherein a ratio of the total thickness of the layers containing a polypropylene resin as a main component to the total thickness of the multilayer structure is 0.75 or more.

[10] The multilayer structure as described in [1] to [9], wherein the ethylene-vinyl alcohol copolymer (c) contains 20 to 200 ppm of at least one polyvalent metal ion (e) selected from the group consisting of magnesium ion, calcium ion and zinc ion.

[11] The multilayer structure as described in [1] to [10], wherein the ethylene-vinyl alcohol copolymer (c) contains 40 to 400 ppm of a polycarboxylic acid (f) having at least one pKa of 3.5 to 5.5.

[12] The multilayer structure as described in [1] to [11], wherein the ethylene-vinyl alcohol copolymer (c) contains 1000 to 10000 ppm of a hindered phenolic compound (g) having an ester bond or an amide bond.

[13] The multilayer structure as described in [1] to [12], wherein the barrier resin layer (C) further contains a polyamide resin (h) and a mass ratio (c/h) of the ethylene-vinyl alcohol copolymer (c) to the polyamide resin (h) is 78/22 to 98/2.

[14] A packaging material for a retort comprising the multilayer structure as described in [1] to [13].

[15] The packaging material for a retort as described in [14], wherein an oxygen transmission rate (at 20° C. and 65% RH) both before and after retorting treatment at 120° C. for 30 min is less than 2 cc/(m²·day·atm).

[16] The packaging material for a retort as described in [14] or [15], wherein a light transmittance at a wavelength of 600 nm both before and after retorting treatment at 120° C. for 30 min is 10% or less.

[17] A recovered composition comprising a recovered material of the multilayer structure as described in [1] to [13].

[18] A method for recovering a multilayer structure, comprising pulverizing and then melt-molding the multilayer structure as described in [1] to [13].

Effects of the Invention

A multilayer structure of the present invention is preferably used as a packaging material for a retort because it is excellent in appearance, gas barrier ability, and shading performance both before and after retorting treatment. In addition, a multilayer structure of the present invention has excellent uniformity with less spots and coloring when being melt-molded after pulverizing. It can, therefore, provide a packaging material for a retort which is highly applicable to post-consumer recycling.

MODES FOR CARRYING OUT THE INVENTION

There will be described embodiments of the present invention. In the following description, specific materials (compounds and the like), which exhibit a particular function may be exemplified, but the present invention is not limited to an aspect using such a material. Furthermore, unless otherwise specified, the exemplified materials can be used alone or in combination.

<Outer Layer (A) and Inner Layer (B)>

A multilayer structure of the present invention has an outer layer (A) containing a polypropylene resin (a) as a main component and an inner layer (B) containing a polypropylene resin (b) as a main component. Since a polypropylene resin exhibits excellent heat resistance, mechanical properties and heat sealability, and is economically available, a multilayer structure having layers containing a polypropylene resin as a main component as an outer layer and an inner layer is preferably used as a packaging material for a retort. The polypropylene resin (a) and the polypropylene resin (b) can be the same or different from each other. Examples of a polypropylene resin include polypropylene; a propylene copolymer prepared by copolymerizing propylene with an α-olefin such as ethylene, 1-butene, 1-hexene and 4-methyl-1-pentene. Furthermore, other examples of a polypropylene resin include a graft-modified polypropylene prepared by graft-modifying these with an acid and a propylene copolymer prepared by copolymerizing propylene with an acid. A propylene unit content in the propylene copolymer must be 50 mol % or more, preferably 70 mol % or more, more preferably 90 mol % or more, still more preferably 95 mol % or more. Furthermore, a content of the polypropylene resin (a) in the outer layer (A) and a content of the polypropylene resin (b) in the inner layer (B) must be 50% by mass or more, preferably 70% by mass or more, more preferably 90% by mass or more, still more preferably 95% by mass or more.

A melting point of the polypropylene resin (a) and the polypropylene resin (b) must be 140° C. or higher and lower than 170° C., respectively, and preferably, at least one melting point is 160° C. or higher and lower than 170° C., and more preferably both melting points are 160° C. or higher and lower than 170° C. With a melting point within the above range, heat sealability and retort resistance of a multilayer structure obtained are improved, and when the multilayer structure is pulverized and then melt-molded, it is excellent in uniformity. An MFR (melt flow rate, 210° C., under a load of 2.16 kg) of the polypropylene resin is generally 0.5 to 50 g/10 min. With an MFR of the polypropylene within the above range, melt moldability of the polypropylene resin and the pulverized multilayer structure containing the polypropylene resin is improved. In the present invention, an MFR of a resin is measured in accordance with JIS K 7210:2014. A density of the polypropylene is usually 0.88 to 0.93 g/cm³.

The outer layer (A) and the inner layer (B) are films formed using the polypropylene resins (a) and (b) as a main components, respectively. There are no particular restrictions to a method for forming a film of such a layer, and it is generally formed by melt extrusion with an extruder. The outer layer (A) and the inner layer (B) can be either a non-stretched film, a uniaxially stretched film, or a biaxially stretched film, and in the light of improving mechanical strength, the outer layer (A) is a biaxially stretched film and in the light of improving the heat sealability, the inner layer (B) is preferably a non-stretched film. There are no particular restrictions to a stretching method, which can be simultaneous stretching or sequential stretching. In terms of a drawing ratio, it is preferable in the light of thickness uniformity and mechanical strength of a film obtained that an area magnification is 8 to 12 times. An area magnification is preferably 12 times or less, more preferably 11 times or less. In terms of a drawing ratio, an area magnification is preferably 8 times or more, more preferably 9 times or more. If an area magnification is less than 8 times, stretch spots may remain, while if it is more than 12 times, a film may be easily broken during stretching.

A thickness of the outer layer (A) and of the inner layer (B) is preferably 20 to 150 μm in the light of industrial productivity. Specifically, a thickness of a non-stretched film is more preferably 20 to 150 μm, and a thickness of a biaxially stretched film is more preferably 20 to 60 μm.

A thickness of each layer in a multilayer structure of the present invention can be appropriately adjusted depending on an intended use, and in the light of improving recyclability, a ratio of the total thickness of layers containing a polypropylene resin as a main component to the total thickness of the multilayer structure is preferably 0.75 or more, more preferably 0.85 or more. In the light of improving gas barrier ability, the ratio is preferably 0.98 or less.

<Barrier Resin Layer (C)>

A multilayer structure of the present invention has a barrier resin layer (C) containing EVOH (c) as a main component. Since EVOH (c) is excellent in gas barrier ability, a multilayer structure having a layer containing EVOH (c) as a main component as an intermediate layer is suitably used as a packaging material for a retort. Furthermore, since EVOH (c) can be easily melt-mixed with a polypropylene resin, it can provide a packaging material for a retort which is excellent in recyclability. Furthermore, a content of EVOH (c) in the barrier resin layer (C) must be 50% by mass or more, preferably 70% by mass or more, more preferably 90% by mass or more, still more preferably 95% by mass or more.

EVOH (c) is usually produced by saponifying an ethylene-vinyl ester copolymer obtained by polymerizing ethylene and a vinyl ester. An ethylene unit content of EVOH (c) is 15 to 60 mol %. With an ethylene unit content of 15 mol % or more, melt moldability of EVOH (c) and a pulverized multilayer structure containing EVOH (c) is improved. An ethylene unit content is preferably 20 mol % or more, more preferably 25 mol % or more. On the other hand, with an ethylene unit content of 60 mol % or less, gas barrier ability of a multilayer structure of the present invention is improved. An ethylene unit content is preferably 50 mol % or less, more preferably 40 mol % or less. A saponification degree of EVOH (c) is 85 mol % or more. A saponification degree means a ratio of the number of vinyl alcohol units to the total number of vinyl alcohol units and vinyl ester units in EVOH (c). With a saponification degree of 85 mol % or more, gas barrier ability of a multilayer structure of the present invention is improved. A degree of saponification is preferably 95 mol % or more, more preferably 99 mol % or more. An ethylene unit content and a saponification degree of EVOH (c) can be determined by $^1$H-NMR spectrometry.

EVOH (c) can contain monomer units other than ethylene, a vinyl ester and vinyl alcohol as long as the effects of the present invention are not impaired. A content of the other monomer unit is preferably 5% by mass or less, more preferably 3% by mass or less, further preferably 1% by mass or less, and particularly preferably the other monomer unit is substantially absent. Examples of other monomer units include α-olefins such as propylene, 1-butene, 1-hexene and 4-methyl-1-pentene, (meth)acrylic acid esters; unsaturated carboxylic acids such as maleic acid, fumaric acid and itaconic acid; alkyl vinyl ethers; N-(2-dimethylaminoethyl)methacrylamide or a quaternized product thereof; N-vinylimidazole or a quaternized product thereof; N-vinylpyrrolidone; N,N-butoxymethylacrylamide, vinyltrimethoxysilane; vinylmethyldimethoxysilane; and vinyldimethylmethoxysilane.

An MFR (210° C., under a 2.16 kg load) of EVOH (c) is preferably 0.5 to 50 g/10 min. An MFR of EVOH(c) is more preferably 1 g/10 min or more, further preferably 2 g/10 min or more. On the other hand, an MFR of EVOH (c) is more preferably 30 g/10 min or less, further preferably 15 g/10 min or less. With an MFR of EVOH (c) within the above range, melt moldability of EVOH (c) and a pulverized multilayer structure containing EVOH (c) is improved.

EVOH (c) preferably contains 20 to 200 ppm of at least one polyvalent metal ion (e) selected from the group consisting of magnesium ion, calcium ion and zinc ion. Since a multilayer structure of the present invention has a metal deposited layer (D) containing aluminum as a main component, aluminum may promote a cross-linking reaction of the resin during melt molding of the pulverized product, resulting in thickening or gelation. A certain amount of polyvalent metal ion (e) suppresses thickening, gelation and adhesion of the resin to the screw. In particular, EVOH (c) preferably contains magnesium ion or calcium ion, more preferably magnesium ion as the polyvalent metal ion (e). Furthermore, EVOH (c) preferably contain the polyvalent metal ion (e) as a carboxylic acid salt. Here, the carboxylic acid can be either an aliphatic carboxylic acid or an aromatic carboxylic acid, preferably an aliphatic carboxylic acid. Examples of an aliphatic carboxylic acid include formic acid, acetic acid, propionic acid, butyric acid, lauric acid, stearic acid, myristic acid, behenic acid and montanic acid, preferably acetic acid. It is also preferable that the polyvalent metal ion (e) is contained as a salt of a polycarboxylic acid (f) described later.

A content of the polyvalent metal ion (e) in EVOH (c) is preferably 20 to 200 ppm. With the content of 20 ppm or more, viscosity stability of a pulverized multilayer structure is improved, and gelation of the resin and adhesion of the resin to a screw in an extruder are suppressed. A content of the polyvalent metal ion (e) is more preferably 40 ppm or more. On the other hand, with the content of the polyvalent metal ion (e) of 200 ppm or less, excessive decomposition of the pulverized multilayer structure is suppressed, and a hue of the recovered composition becomes good. A content of the polyvalent metal ion (e) is more preferably 150 ppm or less.

EVOH (c) preferably contains 40 to 400 ppm of a polycarboxylic acid (f) having at least one pKa of 3.5 to 5.5. With the content of 40 ppm or more, decomposition and coloring of the resin during melt-molding of a pulverized multilayer structure are suppressed. The content is more preferably 60 ppm or more. With the content of 400 ppm or less, excessive cross-linking of the pulverized multilayer structure can be suppressed. A content of the polycarboxylic acid (f) is more preferably 300 ppm or less.

A polyvalent carboxylic acid (f) is a compound having two or more carboxyl groups in one molecule, and pKa of at least one carboxyl group can be within the range of 3.5 to 5.5; for example, oxalic acid (pKa2=4.27), succinic acid (pKa1=4.20), fumaric acid (pKa2=4.44), malic acid (pKa2=5.13), glutaric acid (pKa1=4.30, pKa2=5.40), adipic acid (pKa1=4.43, pKa2=5.41), pimeric acid (pKa1=4.71), phthalic acid (pKa2=5.41), isophthalic acid (pKa2=4.46), telephthalic acid (pKa1=3.51, pKa2=4.82), citric acid (pKa2=4.75), tartaric acid (pKa2=4.40), glutamic acid (pKa2=4.07), and aspartic acid (pKa=3.90).

EVOH (c) preferably contains 1000 to 10000 ppm of a hindered phenolic compound (g) having an ester bond or an amide bond. With a content of 1000 ppm or more, coloring, thickening and gelation of the resin during melt-molding of a pulverized multilayer structure can be suppressed. A content of the hindered phenolic compound (g) is more preferably 2000 ppm or more. On the other hand, with a content of the hindered phenol-based compound (g) of 10,000 ppm or less, coloring and bleedout derived from the hindered phenol-based compound (g) can be suppressed. A content of the hindered phenolic compound (g) is more preferably 8000 ppm or less.

The hindered phenolic compound (g) has at least one hindered phenol group. A hindered phenol group refers to a group in which a bulky substituent is bonded to at least one of the carbons adjacent to the carbon to which the hydroxyl group of the phenol is bonded. The bulky substituent is preferably an alkyl group having 1 to 10 carbon atoms, more preferably a t-butyl group.

The hindered phenolic compound (g) is preferably in a solid state around room temperature. In the light of suppressing bleedout of the compound (g), a melting point or softening temperature of the hindered phenolic compound (g) is preferably 50° C. or higher, more preferably 60° C. or higher, still more preferably 70° C. or higher. From the same viewpoint, a molecular weight of the hindered phenolic compound (g) is preferably 200 or more, more preferably 400 or more, still more preferably 600 or more. On the other hand, the molecular weight is generally 2000 or less. Furthermore, in the light of facilitating mixing with EVOH (c), a melting point or softening temperature of the hindered phenolic compound (g) is preferably 200° C. or lower, more preferably 190° C. or lower, still more preferably 180° C. or lower.

The hindered phenolic compound (g) must have an ester bond or an amide bond. Examples of a hindered phenol compound (g) having an ester bond include an ester of an aliphatic carboxylic acid having a hindered phenol group with an aliphatic alcohol, and examples of a hindered phenol compound (g) having an amide bond include amides of an aliphatic carboxylic acid having a hindered phenol group with an aliphatic amine. In particular, the hindered phenolic compound (g) preferably has an amide bond.

Specific structures of the hindered phenolic compound (g) preferably include pentaerythritol tetrakis[3-(3,5-di-tert-butyl-4-hydroxyphenyl) propionate, which is commercially available from BASF as Irganox 1010; stearyl 3-(3,5-di-tert-butyl-4-hydroxyphenyl)propionate which is commercially available as Irganox 1076; 2,2'-thiodiethyl bis[3-(3,5-di-tert-butyl-4-hydroxyphenyl) propionate] which is commercially available as Irganox 1035; octadecyl 3-(3,5-di-tert-butyl-4-hydroxyphenyl)propanoate which is commercially available as Irganox 1135; bis(3-tert-butyl-4-hydroxy-5-methylbenzenepropanoic acid) ethylene bis(oxyethylene) which is commercially available as Irganox 245; 1,6-hexanediol bis[3-(3,5-di-tert-butyl-4-hydroxyphenyl) propionate] which is commercially available as Irganox 259; N,N'-hexamethylene bis[3-(3,5-di-tert-butyl-4-hydroxyphenyl)propanamide] which is commercially available as Irganox 1098. In particular, preferred are N,N'-hexamethylene bis[3-(3,5-di-tert-butyl-4-hydroxyphenyl)propanamide] which is commercially available as Irganox 1098, and pentaerythritol tetrakis [3-(3,5-di-tert-butyl-4-hydroxyphenyl)propionate] which is commercially available as Irganox 1010, and the former is more preferable.

As long as the effects of the present invention are not impaired, EVOH (c) can contain components other than a polyvalent metal ion (e), a polyvalent carboxylic acid (f), and a hindered phenolic compound (g). Examples of other components include an alkali metal ion, an alkaline earth metal ion other than polyvalent metal ion (e), a carboxylic acid (a monocarboxylic acid) other than a polyvalent carboxylic acid (f), a phosphoric acid compound, a boron compound, a pro-oxidant, an antioxidant other than a hindered phenolic compound (g), a plasticizer, a heat stabilizer (a melt stabilizer), a photo initiator, a deodorant, a UV absorber, an antistatic, a lubricant, a colorant, a filler, a pigment, a dye, a processing aid, a flame retardant and an antifogging agent. In particular, in the light of improving interlayer adhesiveness of the multilayer structure, it is preferable that an alkali metal ion is contained. Furthermore, from the viewpoint that coloring during melt-molding a pulverized EVOH (c) and a multilayer structure containing EVOH (c) can be suppressed, a monocarboxylic acid and a phosphoric acid compound are preferable. A boron compound contained allows for controlling a melt viscosity of EVOH (c) and a pulverized multilayer structure.

There are no particular restrictions to EVOH(c), and it can be produced by melt-kneading EVOH(c), a polyvalent metal ion (e), a polycarboxylic acid (f), a hindered phenolic compound (g) and, if necessary, other additives. The polyvalent metal ion (e), the polyvalent carboxylic acid (f) and the hindered phenolic compound (g) can be blended in a solid state such as powder or as a molten material, or blended as a solute in a solution or a dispersoid in a dispersion. A solution and a dispersion are suitably an aqueous solution and an aqueous dispersion, respectively. Melt-kneading can be conducted using a known mixing or kneading device such as a kneader ruder, an extruder, a mixing roll and a Banbury mixer. A temperature range during melt-kneading can be appropriately adjusted depending on a melting point of EVOH (c) used or the like; it is generally 150 to 300° C.

It is also preferable that a barrier resin layer (C) contains a polyamide resin (hereinafter, sometimes abbreviated as PA) (h), and a mass ratio (c/h) of EVOH (c) to PA (h) is 78/22 to 98/2. A PA (h) contained allows for further improving gas barrier ability and appearance after hot water treatment. If a mass ratio (c/h) is less than 78/22, thickening or gelation is likely to occur during melt molding of a pulverized multilayer structure. On the other hand, if a mass ratio (c/h) exceeds 98/2, improvement of gas barrier ability or appearance after hot water treatment may be insufficient.

Examples of a PA (h) include polycaproamide (Nylon 6), poly-ω-aminoheptanoic acid (Nylon 7), poly-ω-aminononanoic acid (Nylon 9), polyundecaneamide (Nylon 11), polylauryl lactam (Nylon 12), polyethylenediamine adipamide (Nylon 26), polytetramethylene adipamide (Nylon 46), polyhexamethylene adipamide (Nylon 66), polyhexamethylene sebacamide (Nylon 610), polyhexamethylene dodecamide (Nylon 612), polyoctamethylene adipamide (Nylon 86), polydecamethylene adipamide (Nylon 106), caprolactam/lauryllactam copolymer (Nylon 6/12), caprolactam/w-aminononanoic acid copolymer (Nylon 6/9), caprolactam/hexamethylene diammonium adipate copolymer (Nylon 6/66), lauryl lactam/hexamethylene diammonium adipate copolymer (Nylon 12/66), ethylene diammonium adipate/hexamethylenediammonium adipate copolymer (Nylon 26/66), caprolactam/hexamethylenediammonium adipate/hexamethylenediammonium sebacate copolymer (Nylon 6/66/610), ethylenediammonium adipate/hexamethylenediammonium adipate/hexamethylenediammonium sebacate copolymer (Nylon 26/66/610), polyhexamethylene isophthalamide (Nylon 6I), polyhexamethylene terephthalamide (Nylon 6T), hexamethylene isophthalamide/hexamethylene terephthalamide copolymer (Nylon 61/6T), 11-aminoundecaneamide/hexamethylene terephthalamide copolymer, polynonamethylene terephthalamide (Nylon 9T), polydecamethylene terephthalamide (Nylon 10T), polyhexamethylene cyclohexylamide, polynonamethylene cyclohexylamide, and these polyamides modified with an aromatic amine such as methylenebenzylamine and metaxylenediamine. Metaxylylenediammonium adipate is also another example. In particular, in the light of particularly improving gas barrier ability and appearance after hot water treatment, a polyamide resin mainly made of caproamide is preferable. Specifically, it is preferable that 75 mol % or more of constituent units of PA (h) is a caproamide unit. Among others, in the light of compatibility with EVOH (c), PA (h) is preferably Nylon 6.

There are no particular restrictions to a method for polymerizing PA(h), and a known method can be employed, including melt polymerization, interfacial polymerization, solution polymerization, bulk polymerization, solid phase polymerization, and a combination thereof.

In one embodiment of the present invention, a barrier resin layer (C) is a monolayer film formed by using the above EVOH (c) as a main component. There are no particular restrictions to a method for forming such a layer, and generally, a film is formed by melt extrusion with an extruder. A barrier resin layer (C) can be a monolayer film having a thickness of 8 to 40 μm, or a biaxially stretched monolayer film having a thickness of 8 to 20 μm obtained by biaxially stretching the monolayer film. In the light of improving gas barrier ability, it is preferable to use a biaxially stretched monolayer film as the barrier resin layer (C). There are no particular restrictions to a stretching method, and either simultaneous stretching or sequential stretching can be employed. In terms of a drawing ratio, an area magnification is preferably 8 to 12 in the light of uniformity of a thickness, gas barrier ability and mechanical strength of a film obtained. An area magnification is preferably 12 times or less, more preferably 11 times or less. In terms of a drawing ratio, an area magnification is preferably 8 times or more, more preferably 9 times or more. If an area magnification is less than 8 times, stretch spots may remain, while if it is more than 12 times, a film may be easily broken during stretching. Furthermore, a raw sheet before stretching can be preliminarily impregnated with water, to facilitate continuous stretching. A moisture content of the raw sheet before stretching is preferably 2% by mass or more, more preferably 5% by mass or more, further preferably 10% by mass or more. A moisture content of the raw sheet before stretching is preferably 30% by mass or less, more preferably 25% by mass or less, further preferably 20% by mass or less. If a moisture content is less than 2% by mass, stretch spots may remain, and especially when stretching in a width direction of the roll, a stretching ratio of a part close to a grip holding the film becomes high, so that tearing is likely to occur near the grip. If a moisture content is more than 30% by mass, an elastic modulus of the stretched part is low, and a difference from a non-stretched part is not sufficient, so that stretch spots may remain. A temperature during stretching varies depending on a moisture content of the raw sheet before stretching, and it is generally within a temperature range of 50° C. to 130° C. In particular, in simultaneous biaxial stretching, a biaxially stretched film having few stretch spots can be obtained at a temperature within the range of 70° C. to 100° C. In a sequential biaxial stretching, a temperature is within the range of 70° C. to 100° C. for stretching in the longitudinal direction of the roll and of 80° C. to 120° C. for stretching in the width direction of the roll, giving a biaxially stretched film with few stretch spots.

A thickness of the barrier resin layer (C) is preferably 8 to 40 μm in the light of industrial productivity. Specifically, a thickness of a non-stretched film is more preferably 8 to 40 μm, while a thickness of a biaxially stretched film is more preferably 8 to 20 μm.

In another embodiment of the present invention, a barrier resin layer (C) is also preferably a single layer of a coextruded film composed of two or more layers including the barrier resin layer (C). A layer of the coextruded film except for the barrier resin layer (C) is preferably composed of a layer containing a resin other than the EVOH resin as a main component, more preferably a layer containing a polypropylene resin as a main component, further preferably a layer made of a polypropylene resin alone. The polypropylene resin in the co-extruded film can be either an unmodified polypropylene resin or a modified polypropylene resin. Examples of an acid-modified polypropylene resin include resins obtained by modifying a polypropylene resin with maleic acid, fumaric acid, itaconic acid, maleic anhydride, itaconic anhydride or the like. The acid-modified polypropylene resin can be used as a polypropylene adhesive resin.

There are no particular restrictions to a method for forming a coextruded film, and it is generally formed by a melt molding method in which melt extrusion is conducted by an extruder. Here, a thickness of the coextruded film is preferably 8 to 120 μm, and a thickness of the barrier resin layer (C) is preferably 1 to 20 μm. When the coextruded film is formed by biaxially stretching, a thickness of the coextruded film is preferably 8 to 60 μm, and a thickness of the barrier resin layer (C) is preferably 1 to 10 μm. There are no particular restrictions to a stretching method, and both simultaneous stretching and sequential stretching can be employed. In terms of a drawing ratio, an area magnification is preferably 8 to 12 times in the light of uniformity in a thickness and mechanical strength of the obtained film. An area magnification is preferably 12 times or less, more preferably 11 times or less. In terms of a drawing ratio, an area magnification is preferably 8 times or more, more preferably 9 times or more. If an area magnification is less than 8 times, stretch spots may remain, while if it is more than 12 times, a film may be easily broken during stretching.

<Metal Deposited Layer (D)>

A metal deposited layer (D) is a layer containing aluminum as a main component. A content of aluminum atoms in the metal deposited layer (D) must be 50 mol % or more, preferably 70 mol % or more, more preferably 90 mol % or more, still more preferably 95 mol % or more. The metal deposited layer (D) may be laminated on any layer constituting the multilayer structure, and it is preferably adjacent to the barrier resin layer (C). An average thickness of the metal deposited layer (D) is preferably 120 nm or less, more preferably 100 nm or less, even more preferably 90 nm or less. An average thickness of the metal deposited layer (D) is preferably 30 nm or more, more preferably 45 nm or more, even more preferably 60 nm or more. An average thickness of the metal-deposited layer (D) is an average value of the thicknesses at any 10 points of the cross section of the metal-deposited layer (D) s measured by an electron microscope. In the light of reducing coloring of a recovered composition of the multilayer structure, when the multilayer structure has a plurality of metal deposited layers (D), the total thickness of the metal deposited layers (D) is preferably 1 μm or less. The metal deposited layer (D) in the multilayer structure of the present invention allows for achieving a light transmittance of 10% or less at a wavelength of 600 nm, which means excellent shading performance.

In metal deposition, the upper limit of a surface temperature of the layer on which the metal is deposited is preferably 60° C., more preferably 55° C., even more preferably 50° C. The lower limit of the surface temperature is, but not limited to, preferably 0° C., more preferably 10° C., even more preferably 20° C. Before the metal deposition, the surface of the layer on which the metal is deposited can be plasma-treated. The plasma treatment can be a known method, preferably atmospheric pressure plasma treatment. In the atmospheric pressure plasma treatment, a discharge gas used is nitrogen, helium, neon, argon, krypton, xenon, radon or the like. Among these, nitrogen, helium, and argon are preferably used, and nitrogen is particularly preferable because a cost can be reduced.

<Multilayer Structure>

A layer structure of the multilayer structure of the present invention is a four or more layered multilayer structure comprising at least an outer layer (A) containing a polypropylene resin (a) as a main component, an inner layer (B) containing a polypropylene resin (b) as a main component, a barrier resin layer (C) containing an ethylene-vinyl alcohol copolymer (c) as a main component, and a metal deposited layer (D) containing aluminum as a main component, wherein the barrier resin layer (C) and the metal deposited layer (D) are positioned between the outer layer (A) and the inner layer (B); the total thickness is 200 μm or less; and the multilayer structure contains neither a layer containing a resin having a melting point of less than 140° C. as a main component, a layer containing a resin having a melting point of 240° C. or more, nor a metal layer having a thickness of 1 μm or more.

The multilayer structure of the present invention having the outer layer (A) and the inner layer (B) containing a polypropylene resin as a main component exhibits sufficient heat resistance and is thus suitably used as a packaging material for a retort.

Furthermore, the multilayer structure of the present invention has both a barrier resin layer (C) containing EVOH (c) as a main component and a metal deposited layer (D) containing aluminum as a main component, which are positioned between the outer layer (A) and the inner layer (B), so that it exhibits excellent gas barrier ability and shading performance both before and after the retorting treatment.

Furthermore, it is necessary that the multilayer structure of the present invention does not have a metal layer having a thickness of 1 μm or more. A metal layer having a thickness of more than 1 μm causes a problem of coloring in addition to uneven mixing with other components when a recovered composition is obtained from a pulverized multilayer structure. In the light of further improving gas barrier ability, it is preferable that the barrier resin layer (C) and the metal deposited layer (D) are adjacent to each other. Furthermore, in the light of further improving appearance and gas barrier ability after the retorting treatment, it is preferable that at least one barrier resin layer (C) is positioned in the outer layer (A) side with respect to at least one metal deposited layer (D).

The total thickness of the multilayer structure of the present invention is 200 μm or less. With the total thickness within the above range, the multilayer structure of the present invention is lightweight and flexible, so that it is used for soft packaging. In addition, the amount of resin used in the multilayer structure is small, and thus the environmental burden is reduced.

Since the multilayer structure of the present invention does not have a layer containing a resin having a melting point of lower than 140° C. as a main component, problems such as deformation, whitening, and delamination due to retorting treatment can be suppressed. On the other hand, since the multilayer structure of the present invention does not have a layer containing a resin having a melting point of 240° C. or higher or a metal layer having a thickness of 1 μm or more, uneven mixing with other components during melt molding of a pulverized multilayer structure can be prevented.

In the multilayer structure of the present invention, an oxygen transmission rate (at 20° C. and 65% RH) both before and after retorting treatment at 120° C. for 30 min is preferably less than 2 cc/(m²·day·atm). With an oxygen transmission rate within the above range, the multilayer structure has excellent gas barrier ability.

In the multilayer structure of the present invention, a light transmittance at wavelength of 600 nm both before and after the retorting treatment at 120° C. for 30 min. is preferably 10% or less. With a light transmittance within the above range, the multilayer structure has excellent shading performance.

Each layer constituting the multilayer structure of the present invention can be laminated, if necessary, via an adhesive layer. The adhesive layer can be formed by applying a known adhesive and then drying it. The adhesive is preferably a two-component reaction type polyurethane adhesive in which a polyisocyanate component and a polyol component are mixed and reacted. A thickness of the adhesive layer is, but not limited to, preferably 1 to 5 μm, more preferably 2 to 4 μm.

The multilayer structure of the present invention can have layers other than those described above as long as the effects of the present invention are not impaired. The other layer can be, for example, a printed layer. The printed layer can be contained at any position in the multilayer structure of the present invention, and is preferably located on at least one surface of the outer layer (A). An example of the printed layer is a film obtained by applying a solution containing a pigment or dye and, if necessary, a binder resin, and then drying the film. Examples of a method for applying a printed layer include various coating methods using a wire bar, a spin coater, a die coater, or the like, in addition to a gravure printing method. A thickness of the ink layer is, but not limited to, preferably 0.5 to 10 μm, more preferably 1 to 4 μm.

It is preferable to reuse a recovered material (scrap) obtained by recovering end cuts and defective products generated in manufacturing the multilayer structure of the present invention. A method for recovering a multilayer structure comprising crushing and then melt-molding the multilayer structure of the present invention, and a recovered composition containing a recovered multilayer structure of the present invention are also preferred embodiments of the present invention.

When recovering the multilayer structure of the present invention, a recovered multilayer structure of the present invention is first crushed. The crushed recovered product can be melt-molded as it is to obtain a recovered composition, or if necessary, melt-molded together with other components to obtain a recovered composition. A component which can be added to the recovered product is, for example, a polypropylene resin. The polypropylene resin can be any of those described above as used in the multilayer structure of the present invention. The crushed recovered material can be directly used for manufacturing a molded product such as a multilayer structure. Alternatively, the crushed recovered material can be melt-molded to obtain pellets composed of the recovered composition, and then the pellets can be used for manufacturing a molded product.

A mass ratio of EVOH (c) to a polypropylene resin [EVOH (c)/polypropylene resin] in the recovered composition is preferably 1/99 to 30/70. If the mass ratio is less than 1/99, a usage ratio of the recovered material may decrease. Meanwhile, if the mass ratio exceeds 30/70, melt moldability and mechanical properties of the recovered composition may be deteriorated.

The multilayer structure of the present invention is preferably used as a packaging material for a retort because it is excellent in appearance, gas barrier ability and shading performance both before and after retorting treatment. In addition, the multilayer structure of the present invention is excellent in uniformity when being melt-molded after crushing, and spots and coloring are suppressed, so that a packaging material for a retort which is highly applicable to post-consumer recycling can be provided.

EXAMPLES

There will be further specifically described the present invention with reference to EXAMPLES.
(1) OTR (Oxygen Transmission Rate) Before Retorting Treatment Using the multilayer structures obtained in Examples and Comparative Examples, an oxygen transmission rate was measured where the outer layer (A) was the oxygen supply side while the inner layer (B) was the carrier gas side. Specifically, using an oxygen transmission measuring device ("MOCON OX-TRAN2/21" manufactured by Modern Controls Inc.), an oxygen transmission rate (unit: cc/(m$^2$·day·atm)) was measured under the conditions: temperature: 20° C., humidity of the oxygen supply side: 65% RH, humidity of the carrier gas side: 65% RH, oxygen pressure: 1 atm and carrier gas pressure: 1 atm. A carrier gas was nitrogen gas containing 2% by volume of hydrogen gas. The results were evaluated on a scale of A to E below. Criteria A to C are sufficient levels for actual use.
Criteria
  A: less than 0.1 cc/(m$^2$·day·atm)
  B: 0.1 cc/(m$^2$·day·atm) or more and less than 0.5 cc/(m$^2$·day·atm)
  C: 0.5 cc/(m$^2$·day·atm) or more and less than 2 cc/(m$^2$·day·atm)
  D: 2 cc/(m$^2$·day·atm) or more and less than 20 cc/(m$^2$·day·atm)
  E: 20 cc/(m$^2$·day·atm) or more
(2) OTR (Oxygen Transmission Rate) after Retorting Treatment Two multilayer structures obtained in Examples and Comparative Examples were cut out in a 12 cm square pieces, and then the inner layers (B) were overlaid such that these faced each other, and the three sides were heat-sealed to prepare a pouch. Next, 80 g of water was charged through the opening of the pouch, and the opening was heat-sealed to prepare a pouch filled with water. This was retorted at 120° C. for 30 minutes using a retort device (high-temperature high-pressure cooking sterilization tester "RCS-40RTGN" manufactured by Hisaka Works, Ltd.). After the retorting treatment, the water on the surface of the pouch was wiped off, and the pouch was left in a thermo-hygrostat chamber at 20° C. and 65% RH for 3 hours. Then, the pouch was opened to remover water, and then an OTR was measured where the outer layer (A) is an oxygen supply side and the inner layer (B) was a carrier gas side. Specifically, measurement was carried out as described in (1), and the results were also evaluated according to the same criteria, although the criteria were applied to measured values 24 hours after the start of the measurement.
(3) Shading Performance Before and After Retorting Treatment A pouch was prepared and retort-treated as described in (2). After the retorting treatment, water on the surface of the pouch was wiped off, and the pouch was left in a thermo-hygrostat chamber at 20° C. and 65% RH for 3 hours. For the multilayer structure thus obtained before and after the retorting treatment, a light transmittance at a wavelength of 600 nm was measured using an ultraviolet visible spectrophotometer "UV-2450" manufactured by Shimadzu Corporation, and evaluated in accordance with the following two-level criteria of A and B. Criterion B is a level unsuitable for actual use in applications that require shading performance.
Criteria
  A: Light transmittance at 600 nm is 10% or less
  B: Light transmittance at 600 nm exceeds 10%
(4) Appearance after Retorting Treatment A pouch was prepared and retort-treated as described in (2). After the retorting treatment, water on the surface of the pouch was wiped off, and the pouch was left in a thermo-hygrostat chamber at 20° C. and 65% RH for 3 hours. Then, appearance of the pouch was evaluated in accordance with the following four-level criteria of A to D. Criterion D is a level unsuitable for actual use.
Criteria
  A: Change in appearance was not substantially observed compared to before the retorting treatment.
  B: Mild whitening, discoloration, and deformation were observed.
  C: Moderate whitening, discoloration, and deformation were observed, or partial delamination was observed.
  D: Severe whitening and deformation were observed, or widespread delamination was observed.
(5) Spots and Coloring of a Melt-Molded Product of a Crushed Multilayer Structure A multilayer structure obtained in each of Examples and Comparative Examples was pulverized to a size of 4 mm square or less. This crushed product and a polypropylene resin ("Novatec PP EA7AD" manufactured by Japan Polypropylene Corporation (density: 0.90 g/cc, MFR (230° C., under 2.16 kg load): 1.4 g/10 min)) were blended in a mass ratio (crushed product/polypropylene resin) 20/80 and used for monolayer-film formation under the following extrusion conditions, to give a monolayer film with a thickness of 20 μm. A thickness of the monolayer film was adjusted by appropriately changing a screw rotation speed and a take-up roll speed. Using a polypropylene resin alone, a monolayer film with a thickness of 20 μm as a control was prepared as described above.

Extruder: Uniaxial extruder manufactured by Toyo Seiki Seisakusho, Ltd.

Screw diameter: 20 mmφ (L/D=20, compression ratio=3.5, full-flight type)

Extrusion temperature: C1/C2/C3/D=190/230/230/230° C.

Take-up roll temperature: 80° C.

The spot and coloring status of the obtained monolayer film was evaluated in accordance with the four-level criteria of A to D. Criterion D is a level unsuitable for actual use.
Criteria for Spots
  A: Compared to the control, the amount of spots was almost the same.

B: Compared to the control, the amount of small spots was slightly larger.

C: Compared to the control, the amount of small spots was larger.

D: Compared to the control, the amount of large spots was larger.

Criteria for Coloring

A: Compared to the control, a degree of hue change was small (very pale yellow or very pale gray).

B: Compared to the control, slight coloring was observed (pale yellow or pale gray).

C: Compared to the control, moderate coloring was observed (yellow or gray).

D: Compared to the control, significant coloring was observed and furthermore, unevenness was observed.

(6) Melt Viscosity Stability of a Crushed Multilayer Structure

A multilayer structure obtained in each of Examples and Comparative Examples was pulverized to a size of 4 mm square or less. A torque change when 60 g of this pulverized product was kneaded using a labo plastmill (biaxially different directions) under nitrogen atmosphere at 230° C. and 100 rpm was measured. Torque values (TI and TF, respectively) 10 minutes and 90 minutes after the start of kneading were calculated and evaluated by a TF/TI ratio in accordance with the following four-level criteria of A to D. Criterion D is a level unsuitable for actual use.

Criteria

A: 80/100 or more and less than 120/100

B: 60/100 or more and less than 80/100, or 120/100 or more and less than 140/100

C: 40/100 or more and less than 60/100, or 140/100 or more and less than 160/100

D: Less than 40/100 or 160/100 or more

Preparation Example 1

An EVOH resin (not containing polyvalent metal ion, polycarboxylic acid or a hindered phenol compound) having an ethylene content of 32 mol %, a saponification degree of 99.9 mol % and an MFR (210° C., 2.16 kg load) of 3.60 g/10 min was fed to a twin-screw extruder "TEX30α" (screw diameter: 30 mm) manufactured by Japan Steel Works, Ltd. Furthermore, in a twin-screw extruder, an aqueous solution of magnesium acetate as a polyvalent metal salt was added by a liquid addition pump, and to a downstream side to the addition point, extrusion was conducted using a screw in which a forward staggered kneading disk (Forward kneading disk) has L(screw length)/D(screw diameter)=3 as a screw configuration under the conditions of a melting temperature of 220 to 230° C. and an extrusion speed of 20 kg/hr to provide strands. The obtained strands were cooled and solidified in a cooling bath and then cut to provide EVOH pellets containing 150 ppm of magnesium ions.

Preparation Example 2

EVOH pellets containing 250 ppm of magnesium ions were prepared as described in Preparation Example 1 except that a concentration of the aqueous solution of magnesium acetate was changed.

Preparation Example 3

EVOH pellets containing 150 ppm of calcium ions were prepared as described in Preparation Example 1, except that an aqueous solution of magnesium acetate was replaced with an aqueous solution of calcium acetate and its concentration was changed.

Preparation Example 4

EVOH pellets containing 300 ppm of citric acid were prepared as described in Preparation Example 1, except that an aqueous solution of magnesium acetate was replaced with an aqueous solution of citric acid and its concentration was changed.

Preparation Example 5

EVOH pellets containing 500 ppm of citric acid were prepared as described in Preparation Example 1, except that an aqueous solution of magnesium acetate was replaced with an aqueous solution of citric acid and its concentration was changed.

Preparation Example 6

EVOH pellets containing 5000 ppm of a hindered phenolic compound having an ester bond were prepared as described in Preparation Example 1, except that in addition to an EVOH resin, a hindered phenolic compound having an ester bond ("Irganox 1010" manufactured by BASF) was fed to a twin-screw extruder.

Preparation Example 7

EVOH pellets containing 5000 ppm of a hindered phenolic compound having an amide bond were prepared as described in Preparation Example 1, except that in addition to an EVOH resin, a hindered phenolic compound having an amide bond ("Irganox 1098" manufactured by BASF) was fed.

Preparation Example 8

EVOH pellets containing 15000 ppm of a hindered phenolic compound having an amide bond were prepared as described in Preparation Example 1, except that in addition to an EVOH resin, a hindered phenolic compound having an amide bond ("Irganox 1098" manufactured by BASF) was fed.

Preparation Example 9

Resin pellets containing EVOH and PA which contains 15 parts of a PA resin based on the total of an EVOH resin and the PA resin as well as 150 ppm of magnesium ions based on the EVOH resin were prepared as described in Preparation Example 1, except that in addition of the EVOH resin, Nylon 6 (UBE NYLON SF1018A) as a PA resin and an aqueous solution of magnesium acetate.

Film Formation Example 1

An EVOH resin (not containing polyvalent metal ion, polycarboxylic acid or a hindered phenol compound) having an ethylene content of 32 mol %, a saponification degree of 99.9 mol % and an MFR (210° C., 2.16 kg load) of 3.60 g/10 min was extruded under the following extrusion conditions for a monolayer film forming, to provide an monolayer EVOH film with a thickness of 15 μm. A thickness of the monolayer EVOH film was adjusted by appropriately changing a screw rotation speed and a take-up roll speed.

Extruder: Uniaxial extruder manufactured by Toyo Seiki Seisakusho

Screw diameter: 20 mmφ (L/D=20, compression ratio=3.5, full flight type)

Extrusion temperature: C1/C2/C3/D=190/220/220/220° C.

Take-up roll temperature: 80° C.

Film Formation Example 2

A monolayer EVOH film with a thickness of 30 μm was prepared as described in Film Formation Example 1 except that a screw rotation speed and a take-up roll speed were changed.

Film Formation Example 3

A monolayer EVOH film with a thickness of 135 μm was prepared as described in Film Formation Example 1 except that a screw rotation speed and a take-up roll speed were changed. A moisture content of this monolayer EVOH film was adjusted to 15%, and after preheating at 80° C. for 20 seconds, was subjected to simultaneous biaxial stretching under the conditions of a stretching temperature: 80° C. and a drawing ratio: 9 times (3 times in a longitudinal direction and 3 times in a transverse direction) and a stretching speed: 1 m/min using a biaxial stretching device manufactured by Toyo Seiki Seisakusho. Next, the film obtained was fixed to a wooden frame and heated at a temperature of 140° C. for 10 minutes to provide a biaxially stretched monolayer EVOH with a thickness of 15 μm.

Film Formation Example 4

A three-type three-layer coextruded film (EVOH resin/polypropylene adhesive resin/polypropylene resin=9 μm/9 μm/81 μm) was formed using an EVOH resin (not containing polyvalent metal ions, a polycarboxylic acid, or a hindered phenol compound) with an ethylene content of 48 mol %, a saponification degree of 99.9 mol %, and an MFR (210° C., 2.16 kg load) of 14.8 g/10 min, a polypropylene resin ("Novatec PP EA7AD" manufactured by Japan Polypropylene Corp. (density: 0.90 g/cc, MFR (230° C., under 2.16 kg load) 1.4 g/10 min)) and a polypropylene adhesive resin ("Admer QF500" manufactured by Mitsui Chemicals Inc. (MFR (230° C., under 2.16 kg load): 3.0 g/10 min). The extruder, extrusion conditions, and die used were as follows.
EVOH
Extruder: Single-screw extruder (Toyo Seiki Co., Ltd., Lab machine type ME CO-EXT)
Screw: caliber: 20 mmφ, L/D20, full flight screw
Extrusion temperature: Supply unit/compression unit/measurement unit/die=175/210/220/230° C.
Polypropylene Adhesive Resin
Extruder: Single-screw extruder (Technovel Corporation, SZW20GT-20MG-STD)
Screw: caliber: 20 mmφ, L/D20, full flight screw
Extrusion temperature: Supply unit/compression unit/measurement unit/die=150/200/220/230° C.
Polypropylene Resin
Extruder: Single-screw extruder (Research Laboratory of Plastics Technology Co., Ltd. GT-32-A)
Screw: caliber: 32 mmφ, L/D28, full flight screw
Extrusion temperature: Supply unit/compression unit/measurement unit/die=170/220/230/230° C.

Die: Coat hanger die for a 300 mm width three-type three-layer (manufactured by Research Laboratory of Plastics Technology Co., Ltd.)

In Table 1, the polypropylene adhesive resin and the polypropylene resin constituting the coextruded film are collectively referred to as "PP".

Film Formation Example 5

A three-type, three-layer co-extruded film (EVOH resin/polypropylene adhesive resin/polypropylene resin=27 μm/27 μm/243 μm) was prepared as described in Film Formation Example 4 except that a screw rotation speed and a take-up roll speed were changed. This co-extruded film was stretched three times in a vertical direction and three times in a horizontal direction at 160° C. by a tenter type simultaneous biaxial stretching facility, to provide a three-type three-layer biaxially stretched co-extruded film (EVOH resin/polypropylene adhesive resin/polypropylene resin=3 μm/3 μm/27 μm).

Film Formation Example 6

A three-type three-layer coextruded film (EVOH resin/polypropylene adhesive resin/polypropylene resin=6 μm/6 μm/54 μm) was formed as described in Film Formation Example 4, except that a screw rotation speed and a take-up roll speed were changed.

Film Formation Examples 7 to 14

A monolayer EVOH film with a thickness of 15 μm was prepared as described in Film Formation Example 1 except that the EVOH resin pellets obtained in Preparation Examples 1 to 8 were used.

Film Formation Example 15

A monolayer EVOH film with a thickness of 15 μm was prepared as described in Film Formation Example 1 except that the resin pellets containing to EVOH and PA obtained in Preparation Example 9 was used and an extrusion temperature was as described below.
Extrusion temperature: C1/C2/C3/D=230/230/230/230° C.

Example 1

Aluminum was vacuum-deposited on one side of the monolayer EVOH film obtained in Film Formation Example 1 using "EWA-105" manufactured by Nippon Vacuum Technology Co., Ltd. such that a thickness was 70 nm. Next, a two-part adhesive ("Takelac A-520" and "Takenate A-50" manufactured by Mitsui Chemicals, Inc.) was applied on one side of each of a biaxially stretched polypropylene film (Toyobo Co., Ltd. "Pyrene film-OT P2161", thickness: 30 μm) and a non-stretched polypropylene film (Tohcello Co., Ltd., "RXC-22", thickness: 50 μm) such that a dry thickness of the adhesive was 2 μm (hereinafter, sometimes the aluminum vapor deposition layer is abbreviated as VM, the biaxially stretched polypropylene is abbreviated as BOPP, the non-stretched polypropylene film is abbreviated as CPP, and the adhesive layer is abbreviated as Ad).

Subsequently, the BOPP and CPP coated with the adhesive and the monolayer EVOH film on which aluminum was vapor-deposited were laminated to obtain a multilayer structure having a structure of BOPP30/Ad2/EVOH15NM/Ad2/

CPP50 (the number in the symbol representing each layer represents a thickness in μm of the layer). Here, in the monolayer EVOH film on which aluminum was vapor-deposited, the aluminum-deposited layer was on the CPP side and the EVOH layer was on the BOPP side. The evaluation in (1) to (6) above was performed using the multilayer structure. The results are shown in Table 2.

Examples 2 to 8, 11, 12, 15 to 23 and Comparative Examples 4, 7

A multilayer structure was prepared as described in Example 1, except that the layer structure of the multilayer structure was changed as shown in Table 1. In Examples 6, 7, 9 and 10, the coextruded film obtained in any of Film Forming Examples 4 to 6 was used instead of the monolayer EVOH film. In this case, aluminum was vapor-deposited on the EVOH side surface of the co-extruded film. The multilayer structure obtained was evaluated as described in Example 1. The evaluation results are shown in Table 2. Here, each layer used for the multilayer structure shown in Table 1 is as follows.

BOPP20: biaxially stretched polypropylene film ("Pylen Film-OT P2161" manufactured by Toyobo Co., Ltd., melting point: 164° C., thickness: 20 μm)

BOPP30: biaxially stretched polypropylene film ("Pylen Film-OT P2161" manufactured by Toyobo Co., Ltd., melting point: 164° C., thickness: 30 μm)

BOPP50: biaxially stretched polypropylene film ("Pylen Film-OT P2161" manufactured by Toyobo Co., Ltd., melting point: 164° C., thickness: 50 μm)

CPP30: non-stretched polypropylene film ("Torayfan NO 3951" manufactured by Toray Industries, Inc., melting point: 144° C., thickness: 30 μm)

CPP50: non-stretched polypropylene film ("RXC-22" manufactured by Tohcello Co., Ltd., melting point: 166° C., thickness: 50 μm)

CPP100: non-stretched polypropylene film ("RXC-22" manufactured by Tohcello Co., Ltd., melting point: 166° C., thickness: 100 μm)

BOPET12: stretched polyethylene terephthalate film ("Lumirror P60" manufactured by Toray Industries, Inc., melting point: 256° C., thickness: 12 μm)

PE50: non-stretched polyethylene film ("T.U.X. HZR-2" manufactured by Tohcello Co., Ltd., melting point: 127° C., thickness: 50 μm)

Al9: aluminum foil (thickness: 9 μm)

In Table 1, considering the order of the aluminum-deposited layer and the layer on which aluminum is vapor-deposited, they are represented as, for example, "VM/EVOH" or "EVOH/VM". For example, in the multilayer structure of Example 1, it is shown that the layers are laminated such that the VM layer is the inner layer side and the EVOH layer is the outer layer side. Such a notation also applies to the other aluminum vapor deposition layers.

Furthermore, in Table 1, for the multilayer structure having the coextruded films obtained in Film Formation Examples 4 to 6, a portion composed of the coextruded film is represented in parentheses as, for example, (PP90/EVOH9). Here, "BO" means that it is a biaxially stretched film.

Example 9

Aluminum was vacuum-deposited on the surface of the EVOH resin side of the biaxially stretched coextruded film obtained in Film Formation Example 5 using "EWA-105" manufactured by Nippon Vacuum Technology Co., Ltd., such that a thickness was 70 nm. Next, a two-part adhesive ("Takelac A-520" and "Takenate A-50" manufactured by Mitsui Chemicals, Inc.) was applied to one side of the CPP50 to such an amount that a dry thickness was to be 2 μm and then dried.

Subsequently, the CPP50 coated with the adhesive and the biaxially stretched coextruded film on which aluminum was vapor-deposited were laminated to provide a multilayer structure having a structure of BO(PP30/EVOH3)NM/Ad2/CPP50. The multilayer structure thus obtained was evaluated as described in Example 1. The evaluation results are shown in Table 2.

Example 10

Aluminum was vacuum-deposited on the surface of the EVOH resin side of the coextruded film obtained in Film Formation Example 6 using "EWA-105" manufactured by Nippon Vacuum Technology Co., Ltd., such that a thickness was 70 nm. Next, a two-part adhesive ("Takelac A-520" and "Takenate A-50" manufactured by Mitsui Chemicals, Inc.) was applied to one side of the OPP30 to such an amount that a dry thickness was to be 2 μm and then dried.

Subsequently, the OPP30 coated with the adhesive and the coextruded film on which aluminum was vapor-deposited were laminated to provide a multilayer structure having a structure of BOPP30/Ad2NM/(EVOH6/PP60). The multilayer structure thus obtained was evaluated as described in Example 1. The evaluation results are shown in Table 2.

Example 13

Aluminum was vacuum-deposited on one side of BOPP30 using "EWA-105" manufactured by Nippon Vacuum Technology Co., Ltd., such that a thickness was 70 nm. Next, a two-part adhesive ("Takelac A-520" and "Takenate A-50" manufactured by Mitsui Chemicals, Inc.) was applied to the aluminum vapor-deposited side of BOPP30 and one side of the CPP50 to such an amount that a dry thickness was to be 2 μm and then dried.

Subsequently, the BOPP30 and the CPP50 on which aluminum were vapor-deposited and which were coated with the adhesive as well as the monolayer EVOH film were laminated to provide a multilayer structure having a structure of BOPP30/VM/Ad2/EVOH15/Ad2/CPP50. The multilayer structure thus obtained was evaluated as described in Example 1. The evaluation results are shown in Table 2.

Example 14

Aluminum was vacuum-deposited on one side of CPP50 using "EWA-105" manufactured by Nippon Vacuum Technology Co., Ltd., such that a thickness was 70 nm. Next, a two-part adhesive ("Takelac A-520" and "Takenate A-50" manufactured by Mitsui Chemicals, Inc.) was applied to the aluminum vapor-deposited side of CPP50 and one side of the BOPP30 to such an amount that a dry thickness was to be 2 μm and then dried.

Subsequently, the CPP50 and the BOPP30 on which aluminum were vapor-deposited and which were coated with the adhesive as well as the monolayer EVOH film were laminated to provide a multilayer structure having a structure of BOPP30/Ad2/EVOH15/Ad2NM/CPP50. The multilayer structure thus obtained was evaluated as described in Example 1. The evaluation results are shown in Table 2.

Comparative Example 1

A two-part adhesive ("Takelac A-520" and "Takenate A-50" manufactured by Mitsui Chemicals, Inc.) was applied to one side of the BOPP30 to such an amount that a dry thickness was to be 2 μm and then dried. Then, this and the CPP50 were laminated to provide a multilayer structure which having neither a barrier resin layer (C) nor a metal deposited layer (D). The multilayer structure thus obtained was evaluated as described in Example 1. The evaluation results are shown in Table 2.

Comparative Example 2

A multilayer structure having no metal deposited layers (D) was provided as described in Example 1, except that aluminum was not vapor-deposited on the monolayer EVOH film obtained in Film Formation Example 1. The multilayer structure thus obtained was evaluated as described in Example 1. The evaluation results are shown in Table 2.

Comparative Example 3

Aluminum was vacuum-deposited on one side of BOPP30 using "EWA-105" manufactured by Nippon Vacuum Technology Co., such that a thickness was 70 nm. Then, a two-part adhesive ("Takelac A-520" and "Takenate A-50" manufactured by Mitsui Chemicals, Inc.) was applied to one side of the CPP50 to such an amount that a dry thickness was to be 2 μm and then dried.

Subsequently, the CPP50 coated with the adhesive and the BOPP30 on which aluminum was vapor-deposited were laminated to provide a multilayer structure having a structure of BOPP30/VM/Ad2/CPP50. The multilayer structure thus obtained was evaluated as described in Example 1. The evaluation results are shown in Table 2.

Comparative Example 5

A two-part adhesive ("Takelac A-520" and "Takenate A-50" manufactured by Mitsui Chemicals, Inc.) was applied to one side of BOPET12 to such an amount that a dry thickness was to be 2 μm and then dried. This and BOPP30 were laminated. The above two-part adhesive was applied on the surface of the BOPET12 side and on one side of CPP100, respectively, in such an amount that a dry thickness was to be 2 μm, and dried.

Subsequently, the laminate and the CPP100 which were coated with the adhesive as well as the above monolayer EVOH film on which aluminum was vapor-deposited were laminated, to provide a multilayer having a structure of BOPP30/Ad2/BOPET12/Ad2/EVOH15NM/Ad2/CPP100. The multilayer structure thus obtained was evaluated as described in Example 1. The evaluation results are shown in Table 2.

Comparative Example 6

A two-part adhesive ("Takelac A-520" and "Takenate A-50" manufactured by Mitsui Chemicals, Inc.) was applied to one side of BOPP30 to such an amount that a dry thickness was to be 2 μm and then dried. This and Al9 were laminated. The above two-part adhesive was applied on the surface of the Al9 side and on one side of CPP100, respectively, in such an amount that a dry thickness was to be 2 μm, and dried.

Subsequently, the laminate and the CPP100 which were coated with the adhesive as well as the above monolayer EVOH film on which aluminum was vapor-deposited were laminated, to provide a multilayer having a structure of BOPP30/Ad2/Al9/Ad2/EVOH15NM/Ad2/CPP100. The multilayer structure thus obtained was evaluated as described in Example 1. The evaluation results are shown in Table 2.

TABLE 1

| | Barrier resin layer (C) | | | | | | | | | Metal vapor deposition layer (D) |
| | EVOH (c) | | | | | | | | PA | |
| | Ethylene unit content | Polyvalent metal ion (e) | | Polycarboxylic acid (f) | | Hindered phenolic compound (g) | | (h) | | Thickness |
| | mol % | Type | ppm | Type | ppm | Type | ppm | Type | Content* | nm |
|---|---|---|---|---|---|---|---|---|---|---|
| Example 1 | 32 | — | — | — | — | — | — | — | — | 70 |
| Example 2 | 32 | — | — | — | — | — | — | — | — | 70 |
| Example 3 | 32 | — | — | — | — | — | — | — | — | 70 |
| Example 4 | 32 | — | — | — | — | — | — | — | — | 70 |
| Example 5 | 32 | — | — | — | — | — | — | — | — | 70 |
| Example 6 | 48 | — | — | — | — | — | — | — | — | 70 |
| Example 7 | 48 | — | — | — | — | — | — | — | — | 70 |
| Example 8 | 32 | — | — | — | — | — | — | — | — | 70 |
| Example 9 | 48 | — | — | — | — | — | — | — | — | 70 |

TABLE 1-continued

| | | | | | | | | | | |
|---|---|---|---|---|---|---|---|---|---|---|
| Example 10 | 48 | — | — | — | — | — | — | — | — | 70 |
| Example 11 | 32 | — | — | — | — | — | — | — | — | 50 |
| Example 12 | 32 | — | — | — | — | — | — | — | — | 90 |
| Example 13 | 32 | — | — | — | — | — | — | — | — | 70 |
| Example 14 | 32 | — | — | — | — | — | — | — | — | 70 |
| Example 15 | 32 | Mg | 150 | — | — | — | — | — | — | 70 |
| Example 16 | 32 | Mg | 250 | — | — | — | — | — | — | 70 |
| Example 17 | 32 | Ca | 150 | — | — | — | — | — | — | 70 |
| Example 18 | 32 | — | — | Citric acid | 300 | — | — | — | — | 70 |
| Example 19 | 32 | — | — | Citric acid | 500 | — | — | — | — | 70 |
| Example 20 | 32 | — | — | — | — | Ester | 5000 | — | — | 70 |
| Example 21 | 32 | — | — | — | — | Amide | 5000 | — | — | 70 |
| Example 22 | 32 | — | — | — | — | Amide | 15000 | — | — | 70 |
| Example 23 | 32 | Mg | 150 | — | — | — | — | PA6 | 85/15 | 70 |
| Comparative Example 1 | — | — | — | — | — | — | — | — | — | — |
| Comparative Example 2 | 32 | — | — | — | — | — | — | — | — | — |
| Comparative Example 3 | — | — | — | — | — | — | — | — | — | 70 |
| Comparative Example 4 | 32 | — | — | — | — | — | — | — | — | 70 |
| Comparative Example 5 | 32 | — | — | — | — | — | — | — | — | 70 |
| Comparative Example 6 | 32 | — | — | — | — | — | — | — | — | 70 |
| Comparative Example 7 | 32 | — | — | — | — | — | — | — | — | 70 |

| | Multilayer structure | | | | | |
|---|---|---|---|---|---|---|
| | Layer structure (Outer layer (A) side-Inner layer (B) side) | Film forming method of a layer containing a barrier resin layer (C) | Total thickness μm | Total thickness of metal layers μm | Total thickness of PP layers μm | Thickness ratio of PP layers |
| Example 1 | BOPP30/Ad2/EVOH15/VM/Ad2/CPP50 | Film Formation Example 1 | 99 | 0.07 | 80 | 0.81 |
| Example 2 | BOPP50/Ad2/EVOH15/VM/Ad2/CPP100 | Film Formation Example 1 | 169 | 0.07 | 150 | 0.89 |
| Example 3 | BOPP20/Ad2/EVOH15/VM/Ad2/PP30 | Film Formation Example 1 | 69 | 0.07 | 50 | 0.72 |
| Example 4 | BOPP30/Ad2/EVOH30/VM/Ad2/CPP50 | Film Formation Example 2 | 114 | 0.07 | 80 | 0.70 |
| Example 5 | BOPP30/Ad2/BOEVOH15/VM/Ad2/CPP50 | Film Formation Example 3 | 99 | 0.07 | 80 | 0.81 |
| Example 6 | BOPP30/Ad2/(PP90/EVOH9)/VM/Ad2/CPP50 | Film Formation Example 4 | 183 | 0.07 | 170 | 0.93 |
| Example 7 | BOPP30/Ad2/BO(PP30/EVOH3)/VM/Ad2/CPP50 | Film Formation Example 5 | 117 | 0.07 | 110 | 0.94 |

TABLE 1-continued

| | | | | | | |
|---|---|---|---|---|---|---|
| Example 8 | BOPP30/Ad2/VM/ EVOH15/Ad2/CPP50 | Film Formation Example 1 | 99 | 0.07 | 80 | 0.81 |
| Example 9 | BO(PP30/EVOH3)/VM/ Ad2/CPP50 | Film Formation Example 5 | 85 | 0.07 | 80 | 0.94 |
| Example 10 | BOPP30/Ad2/VM/ (EVOH6/PP60) | Film Formation Example 6 | 131 | 0.07 | 120 | 0.92 |
| Example 11 | BOPP30/Ad2/EVOH15/ VM/Ad2/CPP50 | Film Formation Example 1 | 99 | 0.05 | 80 | 0.81 |
| Example 12 | BOPP30/Ad2/EVOH15/ VM/Ad2/CPP50 | Film Formation Example 1 | 99 | 0.09 | 80 | 0.81 |
| Example 13 | BOPP30/VM/Ad2/ EVOH15/Ad2/CPP50 | Film Formation Example 1 | 99 | 0.07 | 80 | 0.81 |
| Example 14 | BOPP30/Ad2/EVOH15/ Ad2/VM/CPP50 | Film Formation Example 1 | 99 | 0.07 | 80 | 0.81 |
| Example 15 | BOPP30/Ad2/EVOH15/ VM/Ad2/CPP50 | Film Formation Example 7 | 99 | 0.07 | 80 | 0.81 |
| Example 16 | BOPP30/Ad2/EVOH15/ VM/Ad2/CPP50 | Film Formation Example 8 | 99 | 0.07 | 80 | 0.81 |
| Example 17 | BOPP30/Ad2/EVOH15/ VM/Ad2/CPP50 | Film Formation Example 9 | 99 | 0.07 | 80 | 0.81 |
| Example 18 | BOPP30/Ad2/EVOH15/ VM/Ad2/CPP50 | Film Formation Example 10 | 99 | 0.07 | 80 | 0.81 |
| Example 19 | BOPP30/Ad2/EVOH15/ VM/Ad2/CPP50 | Film Formation Example 11 | 99 | 0.07 | 80 | 0.81 |
| Example 20 | BOPP30/Ad2/EVOH15/ VM/Ad2/CPP50 | Film Formation Example 12 | 99 | 0.07 | 80 | 0.81 |
| Example 21 | BOPP30/Ad2/EVOH15/ VM/Ad2/CPP50 | Film Formation Example 13 | 99 | 0.07 | 80 | 0.81 |
| Example 22 | BOPP30/Ad2/EVOH15/ VM/Ad2/CPP50 | Film Formation Example 14 | 99 | 0.07 | 80 | 0.81 |
| Example 23 | BOPP30/Ad2/EVOH + PA15/VM/Ad2/CPP50 | Film Formation Example 15 | 99 | 0.07 | 80 | 0.81 |
| Comparative Example 1 | BOPP30/Ad2/CPP50 | — | 82 | — | 80 | 0.98 |
| Comparative Example 2 | BOPP30/Ad2/EVOH15/ Ad2/CPP50 | Film Formation Example 1 | 99 | — | 80 | 0.81 |
| Comparative Example 3 | BOPP30/VM/Ad2/CPP50 | — | 82 | 0.07 | 80 | 0.98 |
| Comparative Example 4 | BOPET12/Ad2/EVOH15/ VM/Ad2/CPP100 | Film Formation Example 1 | 131 | 0.07 | 100 | 0.76 |
| Comparative Example 5 | BOPP30/Ad2/BOPET12/ Ad2/EVOH15/VM/Ad2/ CPP100 | Film Formation Example 1 | 163 | 0.07 | 130 | 0.80 |
| Comparative Example 6 | BOPP30/Ad2/Al9/Ad2/ EVOH15/VM/Ad2/CPP100 | Film Formation Example 1 | 160 | 9.07 | 130 | 0.81 |
| Comparative Example 7 | PE50/Ad2/EVOH15/VM/ Ad2/CPP100 | Film Formation Example 1 | 169 | 0.07 | 100 | 0.59 |

*Mass ratio (c/h) of EVOH (c) to PA(h)

TABLE 2

| | OTR (20° C., 65% RH) cc/(m² · day · atm) | | Shading performance | | | Molten molded product of a pulverized multilayer structure | | |
|---|---|---|---|---|---|---|---|---|
| | Before retorting | After retorting | Before retorting | After retorting | Appearance after retorting | Spots | Coloring | Viscosity stability |
| Example 1 | A | B | A | A | B | B | B | B |
| Example 2 | A | A | A | A | A | A | A | A |
| Example 3 | A | C | A | A | C | C | C | C |
| Example 4 | A | B | A | A | C | C | C | C |
| Example 5 | A | A | A | A | B | B | B | B |
| Example 6 | A | C | A | A | B | A | A | A |
| Example 7 | A | B | A | A | B | A | A | A |
| Example 8 | A | C | A | A | C | B | B | B |
| Example 9 | A | C | A | A | C | A | A | A |
| Example 10 | A | C | A | A | C | A | A | A |
| Example 11 | A | C | A | A | C | B | A | B |
| Example 12 | A | A | A | A | A | B | C | B |
| Example 13 | A | C | A | A | B | B | B | B |
| Example 14 | A | C | A | A | B | B | B | B |
| Example 15 | A | B | A | A | B | A | B | A |
| Example 16 | A | B | A | A | B | A | C | A |
| Example 17 | A | B | A | A | B | B | B | A |
| Example 18 | A | B | A | A | B | B | A | B |
| Example 19 | A | B | A | A | B | C | A | C |
| Example 20 | A | B | A | A | B | A | B | B |
| Example 21 | A | B | A | A | B | A | B | B |
| Example 22 | A | B | A | A | B | A | C | A |
| Example 23 | A | A | A | A | A | B | B | A |
| Comparative Example 1 | E | E | B | B | A | A | A | A |
| Comparative Example 2 | B | E | B | B | C | B | A | B |
| Comparative Example 3 | C | E | A | A | B | A | B | A |
| Comparative Example 4 | A | D | A | A | C | D | B | B |
| Comparative Example 5 | A | B | A | A | B | D | B | B |
| Comparative Example 6 | A | A | A | A | A | D | D | D |
| Comparative Example 7 | A | D | A | A | D | B | B | B |

The invention claimed is:

1. A four or more layered multilayer structure comprising at least an outer layer (A) containing a polypropylene resin (a) as a main component, an inner layer (B) containing a polypropylene resin (b) as a main component, a barrier resin layer (C) containing an ethylene-vinyl alcohol copolymer (c) as a main component, and a metal deposited layer (D) containing aluminum as a main component, wherein
the barrier resin layer (C) and the metal deposited layer (D) are positioned between the outer layer (A) and the inner layer (B);
the total thickness is 200 μm or less;
the polypropylene resin (a) and the polypropylene resin (b) have a melting point of 140° C. or more and less than 170° C., respectively;
the ethylene-vinyl alcohol copolymer (c) has an ethylene unit content of 15 to 60 mol % and a saponification degree of 85 mol % or more; and
the multilayer structure contains neither a layer containing a resin having a melting point of less than 140° C. as a main component, a layer containing a resin having a melting point of 240° C. or more, nor a metal layer having a thickness of 1 μm or more.

2. The multilayer structure as claimed in claim 1, wherein the barrier resin layer (C) and the metal deposited layer (D) are adjacent to each other.

3. The multilayer structure as claimed in claim 1, wherein the barrier resin layer (C) is a monolayer film having a thickness of 8 to 40 μm.

4. The multilayer structure as claimed in claim 3, wherein the monolayer film is biaxially stretched.

5. The multilayer structure as claimed in claim 1, wherein the barrier resin layer (C) is one layer of a coextruded film consisting of two or more layers including the barrier resin layer (C); a thickness of the coextruded film is 8 to 120 μm; and a thickness of the barrier resin layer (C) is 1 to 20 μm.

6. The multilayer structure as claimed in claim 5, wherein the coextruded film is biaxially stretched.

7. The multilayer structure as claimed in claim 5, wherein a layer of the coextruded film except for the barrier resin layer (C) is composed of a layer containing a polypropylene resin as a main component.

8. The multilayer structure as claimed in claim 1, wherein at least one barrier resin layer (C) is positioned in the outer layer (A) side with respect to at least one metal deposited layer (D).

9. The multilayer structure as claimed in claim 1, wherein a ratio of the total thickness of the layers containing a polypropylene resin as a main component to the total thickness of the multilayer structure is 0.75 or more.

10. The multilayer structure as claimed in claim 1, wherein the ethylene-vinyl alcohol copolymer (c) contains 20 to 200 ppm of at least one polyvalent metal ion (e) selected from the group consisting of magnesium ion, calcium ion and zinc ion.

11. The multilayer structure as claimed in claim 1, wherein the ethylene-vinyl alcohol copolymer (c) contains 40 to 400 ppm of a polycarboxylic acid (f) having at least one pKa of 3.5 to 5.5.

12. The multilayer structure as claimed in claim 1, wherein the ethylene-vinyl alcohol copolymer (c) contains 1000 to 10000 ppm of a hindered phenolic compound (g) having an ester bond or an amide bond.

13. The multilayer structure as claimed in claim 1, wherein the barrier resin layer (C) further contains a polyamide resin (h) and a mass ratio (c/h) of the ethylene-vinyl alcohol copolymer (c) to the polyamide resin (h) is 78/22 to 98/2.

14. A packaging material for a retort comprising the multilayer structure as claimed in claim 1.

15. The packaging material for a retort as claimed in claim 14, wherein an oxygen transmission rate (at 20° C. and 65% RH) both before and after retorting treatment at 120° C. for 30 min is less than 2 $cc/(m^2 \cdot day \cdot atm)$.

16. The packaging material for a retort as claimed in claim 14, wherein a light transmittance at a wavelength of 600 nm both before and after retorting treatment at 120° C. for 30 min is 10% or less.

17. A recovered composition comprising a recovered material of the multilayer structure as claimed in claim 1.

18. A method for recovering a multilayer structure, comprising pulverizing and then melt-molding the multilayer structure as claimed in claim 1.

* * * * *